May 17, 1938.   W. H. JACOBI ET AL   2,117,888
ELECTRODE FEEDING MECHANISM FOR SEARCHLIGHTS
Filed Oct. 3, 1935
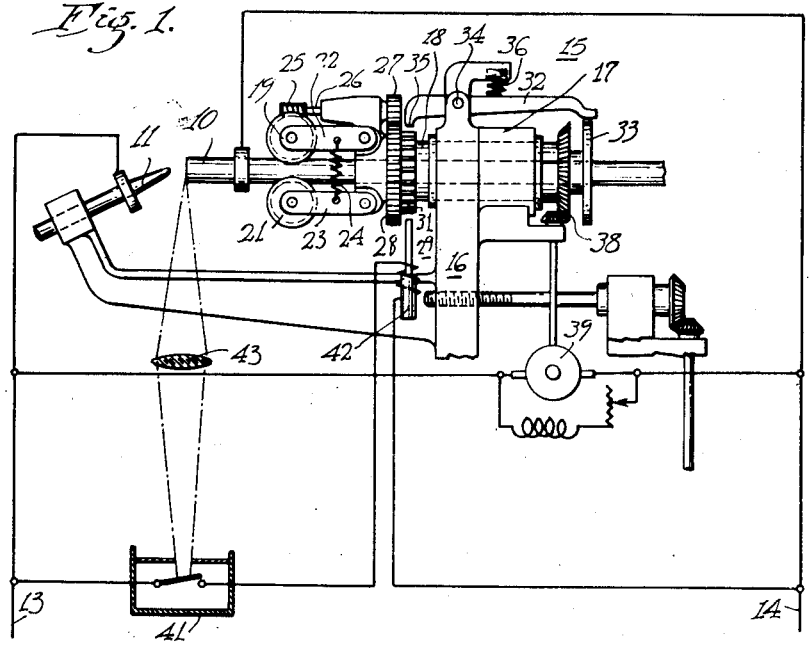
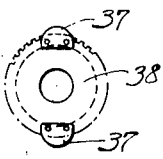
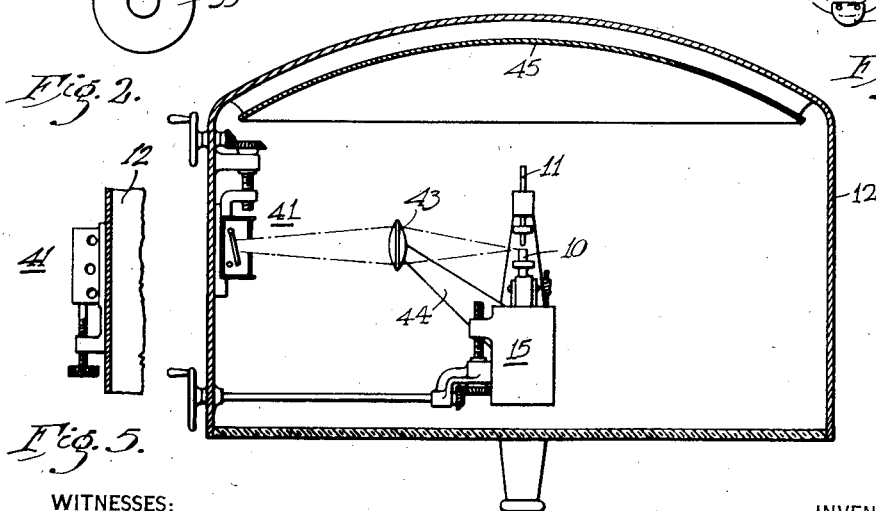
WITNESSES:
INVENTORS
William H. Jacobi +
Irvine A. Yost.
BY
ATTORNEY Patented May 17, 1938

2,117,888

UNITED STATES PATENT OFFICE 2,117,888

ELECTRODE FEEDING MECHANISM FOR SEARCHLIGHTS

William H. Jacobi, Wilkinsburg, Pa., and Irvine A. Yost, Lakewood, Ohio, assignors to Westinghouse Electric & Manufacturing Company, East Pittsburgh, Pa., a corporation of Pennsylvania Application October 3, 1935, Serial No. 43,372

10 Claims. (Cl. 176—66)

The invention relates, generally, to arc lights, and, more particularly, to the control of the feeding of the positive electrode in arc searchlights.

Heretofore, various ways have been devised and put into use for controlling the feed of a positive electrode, or carbon, in an arc searchlight. In the operation of searchlights of this type, it is necessary to maintain the tip or crater of the positive electrode at, or near, a predetermined position with respect to the reflector, or, at the focal point of the reflector.

This function is usually accomplished by controlling the feeding operation in some manner to advance the electrode as it is consumed in the arc and, for automatic operation, is usually effected by utilizing some device in the nature of a thermostat, light-responsive means, or the like, responsive to the position of the crater or tip of the positive electrode to control the operation of the feeding mechanism. Heretofore, it has been the practice to rely solely upon the thermostat or whatever device of this general nature is used, to control the electrode feeding operation thus relying upon a single control agency to perform this important function. The result has been that such methods impose an excessive burden upon the light or heat responsive device thus interfering with its proper operation which renders it incapable of properly controlling the feeding operation and accurately maintaining the positive electrode crater in the desired and necessary position to obtain the best possible operation of the light.

It is intended to overcome these and other defects and disadvantages in the present system by the provision of an electrode feeding device or system which is subjected to a plurality of independent control agencies one of which is of a mechanical nature and the other of which is responsive to the position of the electrode tip or crater and which is actuated by the heat or light energy of the crater.

The object, therefore, of our invention is to provide an electrode feeding device for arc searchlights which shall be of simple and rugged construction, which functions to accurately maintain the crater or tip of the positive electrode in the desired position and which may be easily and economically manufactured and installed.

A more specific object of the invention is to provide for accurately maintaining the tip or crater of an arc-light electrode in a predetermined position.

Another object of the invention is to provide for utilizing two independent control agencies for controlling the feeding operation of an arc light electrode to accurately maintain the burning tip or crater thereof in a predetermined position with respect to the reflector.

A still further object of the invention is to provide for feeding and maintaining the crater of a positive arc light electrode at a predetermined position by the utilization of both mechanical and arc energy responsive control means.

A still further object of the invention is to provide for continuously feeding the positive electrode of an arc light in one predetermined manner corresponding to the predicted rate of consumption thereof and compensating for any irregularities in the normal rate of consumption by feeding the electrode at a different manner whenever the position of the crater or tip thereof, deviates a predetermined amount from the desired or normal position.

Another object of the invention is to provide an electrode feeding mechanism for positive carbons or electrodes of arc searchlights which inherently functions to feed the electrode intermittently at a predetermined rate so long as the crater remains within a predetermined range of positions and which functions to terminate the intermittent feed and continuously feed the electrode at a different rate whenever the crater deviates from the predetermined range and until the crater position is reestablished.

These and other important objects and advantages of the invention will become more apparent from a reading of the following detailed description in conjunction with the drawing, in which Figure 1 is a diagrammatic view of an arc mechanism of a searchlight embodying the principal features of the invention, Fig. 2 is a detail view of the mechanical feeding cam element of Fig. 1, Fig. 3 is a view of a modification of the feeding cam, Fig. 4 is a view of the interior of a typical searchlight drum showing the relative positions of the various feeding and control elements illustrated diagrammatically in Fig. 1, and Fig. 5 is a view showing a modification of the thermostat mounting of Fig. 4.

In practicing the invention as it may be applied to arc searchlights, a holder for the positive electrode is used which is operable to both rotate and feed the electrode. The arrangement is such that the feed rollers, which engage the electrode, are revolved about the axis of the electrode in order to rotate the electrode and are rotated in order to feed the electrode. The feed rollers are mounted on a rotatable element of the holder which may be driven by a motor, which may or may not be a part of the feeding mechanism for the negative electrode, and are geared to a drive element rotatably mounted upon the rotatable element which functions, when held against rotation, to drive the feed rollers. The drive element is controlled to effect an intermittent feeding operation of the electrode by means of a cam-actuated pawl and is further controlled by an electrically-actuated pawl in accordance with the position of the crater to effect a more or less continuous feeding operation. The electrically-operated pawl may be controlled by means of a thermostat or other suitable device responsive to the position of the electrode crater.

Referring now to the drawing, there is illustrated in Fig. 1 thereof a feeding and positioning mechanism for the positive electrode of an arc searchlight which embodies the principles of the invention. While the invention is to be described in connection with arc searchlights, it may be also applied to other arc-lighting devices and by the utilization of the same or different means than those shown.

Since the invention is directed mainly to the control of the feeding of the positive carbon or electrode 10, it has been deemed unnecessary to illustrate or describe any definite form of holder or feeding mechanism for the negative electrode 11. The electrodes 10 and 11 are disposed in arcing relation in the usual manner within the searchlight drum 12 and the negative electrode 11 may be fed to the arc in any suitable and well known manner. A source of power represented by conductors 13 and 14 is provided for operating the arc and other auxiliary apparatus.

In this instance there is provided an electrode holder 15 for the positive electrode 10 which is operable to, both, rotate and feed the electrode. The holder 15 comprises, in general, a support 16 having a bearing portion 17 in which a sleeve member 18 is rotatably mounted. The feed rollers 19 and 21 are mounted upon the rotatable sleeve 18 by pivotally mounted levers 22 and 23 which are drawn together by means of a spring 24 to cause the feed rollers to engage the electrode.

The feed rollers are driven by a worm 25 mounted on a shaft 26 driven by the gear 27. The gear 27 meshes with the toothed portion 28 of a gear wheel 29 which is rotatably or loosely mounted on the sleeve 18 and which is provided with a hub element 31 having suitable grooves or indentations in the outside surface thereof, as shown.

As will be readily understood, so long as the gear wheel 29 is not held against rotation with respect to the sleeve 18, it will rotate with the sleeve 18 and the feed rollers will not be rotated. However, when the gear wheel 29 is held stationary and the sleeve 18 is rotated the gear 27 will be revolved about the gear wheel 29 by the sleeve 18 to effect the rotation of the feed rollers and thereby feed the electrode 10 forwardly.

Heretofore, it has been the usual practice to control the operation of an electrode holder and feeding device of this general character by means of some such device as a thermostat or the like which is responsive to the light or heat energy of the arc or, more particularly, of the crater formed in the burning end of the positive electrode. While this type of control operates with some degree of success, it has been found that there are certain disadvantages present which reduce the reliability and effectiveness of the feeding mechanism, and consequently makes it impossible to obtain the most effective and efficient operation of the arc. In other words, when the entire burden of feeding the positive electrode at the necessary rate to maintain the crater thereof as near as is possible to the focal point of the reflector is placed upon the thermostatic control, it becomes overloaded to such an extent that it cannot accurately and effectively control the feeding operation.

It has been found that far superior and more satisfactory results may be obtained by utilizing a feed control system which is a combination of a mechanical control and an energy responsive control so arranged that the mechanical control causes the positive electrode to be fed at a rate selected to produce the maximum light generation and at a rate which corresponds, as nearly as possible, to the rate of consumption or burning of the electrode.

In this embodiment of the invention this result is produced by a cam-actuated pawl 32 and its actuating cam 33 which are a part of the electrode holder and feeding device 15. The mechanically-actuated pawl 32 is pivotally secured to the support 16 at 34 and is provided with a detent or locking portion 35 which is normally retained out of engagement with the surface 31 of the feed gear 29 by means of a spring 36 and which may be actuated into engagement therewith by the cam element 33.

The cam 33 may be actuated by the sleeve element 18 and may be of any shape necessary to produce the desired amount of feed, such for example, as is shown in Fig. 2. The cam for actuating the pawl 32 may be a separate element as shown or it may comprise one or more cam elements 37 secured directly to the drive gear 38 for the sleeve 18, as shown in Fig. 3.

If it were possible to obtain an electrode which is theoretically perfect as to uniformity of structure and material ingredients present, the feeding rate for any current value could be determined by a series of tests and a feeding mechanism constructed to feed the electrode at the necessary rate to maintain the crater in a desired position. Since it is impossible to obtain electrodes of this nature, and consequently to determine the exact feeding rate, it becomes necessary to determine as near as possible the average rate of feed for a given electrode and arc current which will maintain the crater as near as possible to the desired position and to compensate for the non-uniformity of the electrode by a separate control means which functions to definitely maintain the crater at or near the focal point of the reflector.

In this embodiment of the invention, the mechanical feed, described hereinbefore, is supplemented with a device which is responsive to the position of the tip or crater of the positive electrode. Any suitable device, such for example as a photo-electric, thermo-electric or a thermostatic device may be used for this purpose. As shown, a thermostatic switch 41 responsive to the energy of the crater is utilized for controlling the energization of an electro-magnetic pawl 42 which is disposed to control the feeding gear 29 in the same manner as the mechanically-actuated lever 32. A suitable lens 43 interposed between the crater and the thermostat 41 may be utilized to direct or concentrate the energy thereupon.

The thermostatic switch 41 may be located in any desired position within the searchlight drum 12, as shown in Fig. 4 or without the drum, as shown in Fig. 5, and may be adjustably mounted in order that it may be properly adjusted with respect to the desired position of the crater. The lens 43 may be supported from a suitable bracket 44 carried by the feeding mechanism 15 as shown in order to maintain the burning tip of the positive electrode at a definite distance from the holder.

It is apparent that with this arrangement the electrode 10 may be fed mechanically at some predetermined rate which preferably is slightly less than the average rate of burning of the electrode and that any deficiency which occurs as a result of the non-uniformity of the electrode is compensated for by the arc responsive or thermostatic feed. When the crater recedes a predetermined amount, the thermostatic switch 41 functions to energize the pawl 42 which locks the feeding gear 29 against rotation and thereby causes the electrode 10 to be continually fed at a predetermined constant rate. When the crater is restored to its original position, the thermostatic switch is rendered ineffective and the mechanical feeding operation is resumed. It is apparent that when the electrically-actuated pawl 42 is functioning to control the feeding operation, the mechanical feeding device 32 is ineffective. As soon, however, as the pawl 42 is de-energized, the mechanical feeding device 32 again becomes effective, since it operates continuously regardless of the position of the crater.

The greatest advantage obtained by this arrangement is that the thermostatic control is subjected to a very light duty since its function is only to compensate for the deficiency in the mechanical feed and, therefore, it functions more efficiently than if the entire burden of controlling the feeding operation were placed upon it. This results in a more uniform operation of the feeding mechanism, and consequently, increases the efficiency of the arc. Furthermore, since the thermostatic element 41 is subjected to only a light duty cycle, it is much more reliable in operation since, between operations, sufficient time is afforded for its return to a normal non-operating condition.

Since it is necessary to provide for adjusting the position of the holder 15 with respect to the reflector 45 in order that the electrode crater may be properly positioned, the holder is mounted for movement along the axis of the reflector and provision is made for controlling the movement from without the drum, as shown in Fig. 4.

In view of the foregoing description, it is apparent that the invention provides an electrode feeding mechanism which functions in accordance with an entirely different principle than those now in use. The main feeding operation, which may be referred to as the mechanical feed, results as an inherent operating characteristic of the electrode holder, which eliminates the use of any auxiliary mechanism of any kind for producing this function. The auxiliary or supplementary feeding operation is accomplished through the use of the same electrode holder and feed mechanism by utilizing a suitable device which responds to the position of the crater. While the mechanical feeding operation is illustrated as being of an intermittent nature, it is apparent that the invention is not necessarily so limited since it is possible to utilize the principles of the invention by causing the mechanical feed to also be in the nature of a continuous feeding operation.

Since certain changes may be made in the above described construction and different embodiments of the invention may be made without departing from the spirit thereof, it is intended that all matters contained in the above description, or shown in the accompanying drawing, shall be interpreted as illustrative and not in a limiting sense.

We claim as our invention:

1. In an electrode feeding mechanism for arc lights, mechanical means disposed when operated at a substantially constant speed to intermittently feed the electrode at a substantially constant rate, and means responsive to the position of the electrode tip for causing the feeding mechanism to feed the electrode continuously.

2. In an electrode feeding mechanism for arc lights, mechanical means disposed when operated at a substantially constant speed to intermittently feed the electrode at a substantially constant rate, means operable to cause the feeding mechanism to continuously feed the electrode, and means responsive to the position of the tip of the electrode for controlling the operation of said named means.

3. In an electrode feeding mechanism for arc lights having a positive electrode the crater of which is to be maintained in a predetermined position, in combination, continuously operating means normally operable to intermittently feed the positive electrode at a rate which corresponds substantially to its rate of consumption in the arc, said means being operable to also feed the electrode continuously at a substantially constant rate, and means whereby the said rate of feed is automatically varied in accordance with the position of the crater, thereby to maintain the crater at said predetermined position regardless of any variation in the rate of consumption of the positive electrode.

4. In an electrode feeding mechanism for arc lights having a positive electrode the crater of which is to be maintained in a predetermined position, in combination, means normally operable for intermittently feeding the positive electrode at a rate which corresponds substantially to its rate of consumption in the arc, said feeding means also being operable to feed the electrode continuously and means responsive to the position of the crater for causing the feeding means to change its feeding operation to a continuous feed whenever the crater deviates from said predetermined position.

5. An electrode feeding mechanism for arc lights having a positive electrode the crater of which is to be maintained in a predetermined position comprising, motor-operated means for feeding the electrode in a non-continuous manner at a rate corresponding substantially to its normal rate of consumption, and means including a device responsive to the position of the crater for modifying the operation of the feeding means to cause it to feed in a continuous manner in response to a predetermined movement of the crater from said predetermined position, until the crater is returned to said predetermined position.

6. An electrode feeding mechanism for arc lights having a positive electrode the crater of which is to be maintained in a predetermined position comprising, an electrically-operated device for feeding the electrode, said feeding device being normally operable to feed the electrode forward step by step at a constant rate corresponding to the normal rate of consumption of the electrode and further operable to feed the electrode forward continuously, and means including a heat-responsive element rendered effective dependent upon the position of the crater with respect to said predetermined position for changing the feeding characteristic of the electrically-operated device, whereby the crater is automatically maintained at said predetermined position regardless of any variation in the consumption rate of the electrode.

7. An electrode feeding mechanism for arc lights having a positive electrode the crater of which is to be maintained in a predetermined position comprising a motor-operated mechanism for normally feeding the electrode intermittently at a substantially constant rate, and means including a thermostatic device responsive to the position of the crater operable on a predetermined amount of departure of the crater from said predetermined position to cause the motor-operated device to feed the electrode continuously, thereby to maintain the crater as near as possible in said predetermined position.

8. In an electric arc lamp, an electrode, common means operable to normally continuously rotate the electrode and impart a periodic step-by-step feed movement thereto, said common means also being operable to feed the electrode continuously, and means responsive to the position of the arc for controlling the operation of said common means.

9. In an electric arc lamp, an electrode, common means operable to normally continuously rotate the electrode and impart a periodic step-by-step feed movement thereto, said common means also being operable to feed the electrode continuously, electro-responsive means operable to cause said common means to feed the electrode continuously at a faster rate, and means responsive to the position of the arc for controlling said electro-responsive means.

10. In an electrode feeding mechanism for arc searchlights having a reflector and a positive electrode the crater of which is to be maintained within a predetermined range of positions with respect to the reflector, in combination, a motor-operated mechanism operable to both rotate and normally feed the electrode in a step-by-step movement, means for continuously actuating the feeding means, electrically-operated means operable to cause the feeding mechanism to discontinue the step-by-step feed and feed the electrode in a continuous manner, and means operable in response to the movement of the crater beyond said predetermined range for effecting the operation of said electrically-operated means.

WILLIAM H. JACOBI.
IRVINE A. YOST.